3,387,462
DUAL FUEL INJECTION DEVICE FOR PROPULSION MOTORS, MORE ESPECIALLY FOR METHANE-CARRYING SHIPS

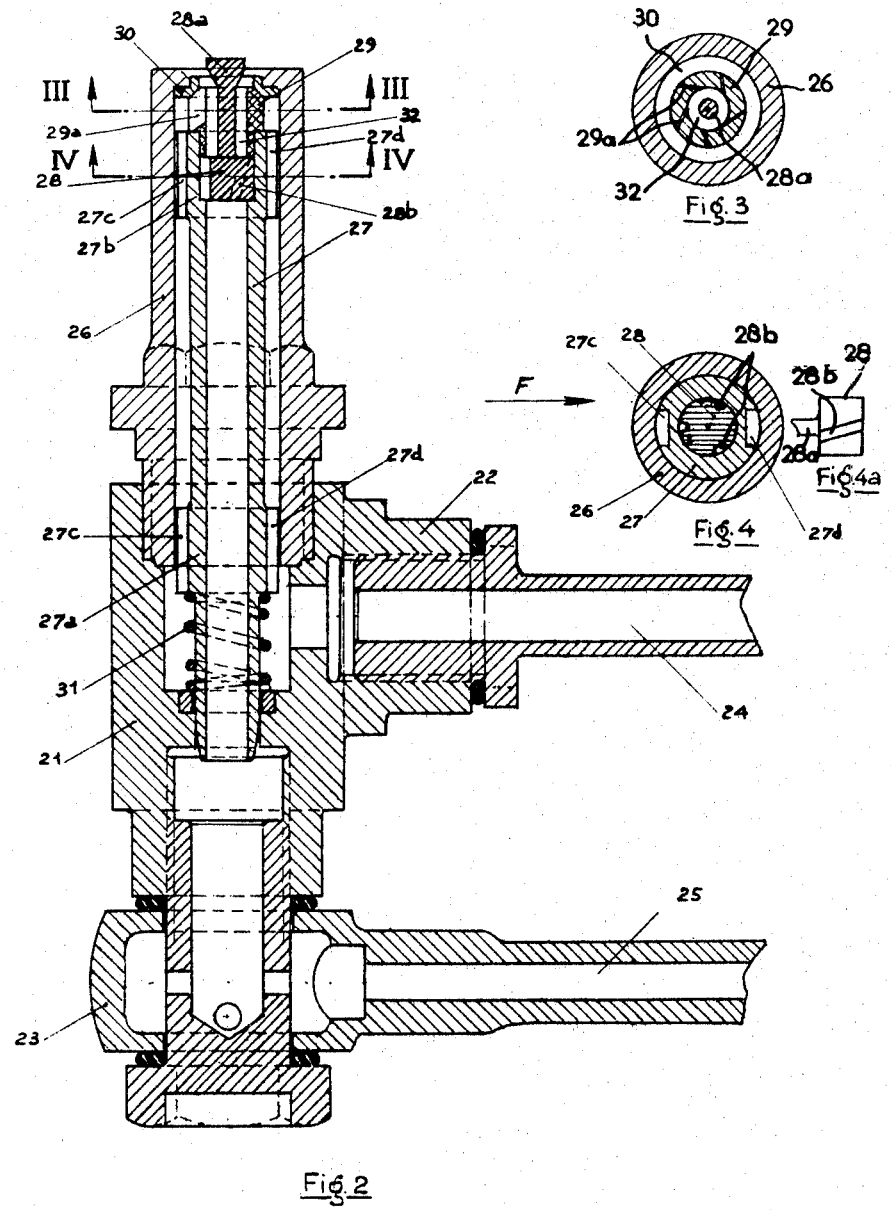

Louis Jules Bauger, Vanves, Roland Robert Charles Beyler, Levallois-Perret, Robert Jean René Dubarry-Barbe, Issy-les-Moulineaux, Marc Pianko, La Celle St.-Cloud, and Walter Vesper, Dammarie-les-Lys, France, assignors to Société Nationale d'Etude et de Construction de Moteurs d'Aviation, Paris, France, a French company
Filed July 25, 1966, Ser. No. 567,413
Claims priority, application France, July 29, 1965, 26,492
5 Claims. (Cl. 62—50)

ABSTRACT OF THE DISCLOSURE

A device for supplying fuel to the combustion chamber of a gas turbine which is used to propel a ship which carries as cargo liquefied combustible gas, said device being adapted to supply said combustion chamber with a fuel which constitutes a combination of conventional gas turbine fuel derived from the ship's conventional fuel tanks together with the vapors which are formed in the ship's cargo tanks which contain said liquefied combustible gas.

---

This invention relates to a device for supplying fuel to the combustion chamber of a gas turbine installation used to propel a ship for transporting combustible liquefied gas, in which device use is jointly made of a conventional liquid fuel and of the gas vapour which forms in the upper part of the ship's tanks containing the liquefied gases.

The use of gaseous fuels poses problems in respect of storage and transport which are harder to solve than those posed by liquid fuels. The conservation of natural gaseous fuels, such as methane, in fact makes it obligatory to accept an energy loss, while that of liquid fuels, such as petroleum or "fuel oil," takes place without special disadvantages. For natural gas, contrary to liquid fuels, constitutes energy definitely lost if there is no means for immediate use in the vicinity or no possibility of transporting it.

The transporting of methane is carried out with such gas in its liquid form. The gas is refrigerated to —160° C., a temperature at which it can be liquefied at atmospheric pressure, its critical constants being —82° C. and approximately 50 bars. The liquefied gas is subsequently despatched into the tanks associated with the transportation means. These tanks remain permanently open to the atmosphere, being constructed so as to be non-hermetic, in order to avoid a rise of internal pressure, this permitting them to be lightly constructed. On the other hand, such tanks must be sufficiently heat-insulated for the evaporation rate to remain within acceptable bounds.

The density of liquid methane is 0.415. This light density leads to the employment of tanks of large capacity. Transport by sea or river is therefore most appropriate. For an equal tonnage, the tanks of a methane carrier will be twice as large as those of an oil tanker.

Losses by evaporation of methane, reckoned at 0.6% by volume a day, correspond to a heating power of 0.915 kcal./s.t., taking into account the heating power of methane (9.5 th./m.³) its density in the liquid state (0.415) and the ratio of its specific volumes in the liquid and in the gaseous state (0.00174). For an overall efficiency for the ship's engine of 22%, the effective power lost is 1.15 H.P./t. or 0.85 kw./t.

The recovery of this energy can be effected by recondensing the vapour as its forms, in such a manner as to re-integrate such vapour with the freight. But this method necessitates the provision of a refrigerating installation on board the methane carrier. This solution is therefore very costly.

The present invention has for its object to provide a device for trapping the vapour to enable such vapour to be employed jointly with the basic fuel of the gas turbine which serves to propel the methane carrying ship, the heating energy thus recovered and estimated above being inadequate in itself to effect this propulsion.

According to the invention, the vapour of the liquefied gas, previously recompressed and heated, together with the conventional liquid fuel, are fed into a mixed-type injector having a single outlet and in which atomization of the liquid fuel is brought about by the vapour of the liquefied gas.

According to one embodiment, the mixed injector comprises, on the one hand, a cylindrical passage into which the gaseous fuel passes and, on the other hand, an annular passage enclosing the cylindrical passage and into which the liquid fuel passes, means being provided to ensure a swirling movement of the two fuels just before their arrival in a common mixing chamber from whence the composite jet is despatched into the combustion chamber.

The expanded vapour, say nitrogen or methane, is of very low temperature and at much reduced pressure. It is therefore necessary, in order to atomize the fuel oil pneumatically, to recompress the vapour and heat it. With this in view, the invention preferably provides that the recompression of the vapour of the liquefied gas will be effected by means of a centrifugal compressor driven by the gas turbine and that the heating of the vapour of the liquefied gas will be effected by heat exchange with at least a portion of the combustion gases.

Methane being transported frequently contains a 5 to 10% proportion of nitrogen, which, being more volatile than methane, is the first to evaporate.

Thus, according to another embodiment of the invention, pneumatic atomization of the liquid fuel is effected, at the time the installation is started up, by the nitrogen alone, it being more volatile, whereas, as the exhaustion of the nitrogen proceeds, evaporated methane is used in its turn for the pneumatic atomization of the liquid fuel. The nitrogen consumed by the injector is lacking in heating power and serves solely for the pneumatic atomization of the fuel oil. When the methane starts to arrive at the injector, pneumatic atomization is retained but richness inside the chamber is then increased.

To maintain the normal state of the gas turbine, it will generally be necessary to provide for control of the liquid fuel flow in such a manner as to maintain at a fixed value the overall heating power of the composite fuel fed to the engine.

With this in view, the flow of liquid fuel can be adjusted as a function of the temperature of the combustion gases, for example by regulating a by-pass valve on the pump for supplying liquid fuel.

In the accompanying drawings:

FIGURE 2 is a longitudinal section, drawn on a larger scale, of one embodiment of injector employed in the installation;

FIGURES 3 and 4 are cross-sections on the lines III—III and IV—IV respectively of FIGURE 2;

FIGURE 4a is a profile view, according to the arrow F in FIGURE 4, of a central part of the injector head.

Figure 1:
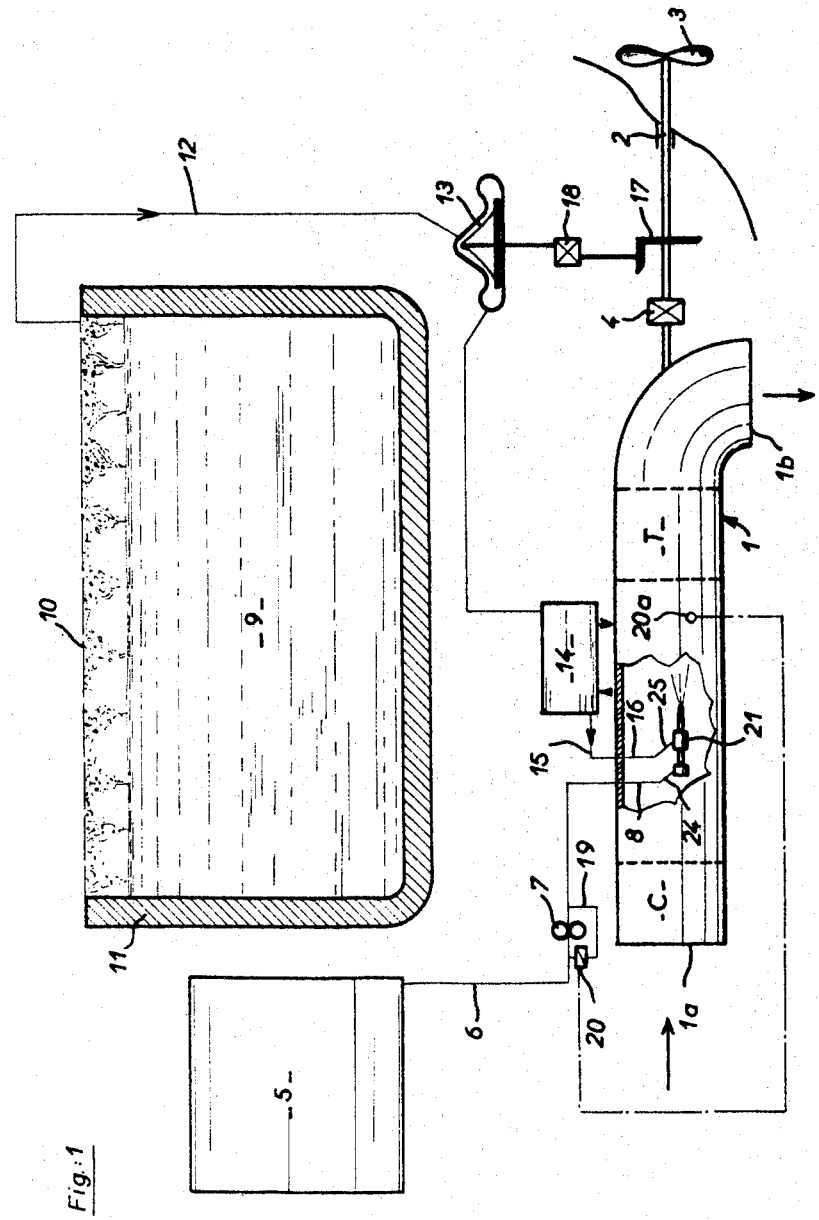
FIGURE 1 is a diagram of an installation conforming to the present invention, showing the course of the various fluids.

In the installation for recovering gaseous losses of methane illustrated in FIGURE 1, the gas turbine installation, shown diagrammatically at 1 with its air intake 1a, its compressor C, its turbine T and its outlet pipe 1b, drives the main shaft 2 on which is keyed the screw 3 of the methane carrier through the intermediary of reduction gearing 4. It is supplied by a fuel oil tank 5 by way of a pipe 6, a gear pump 7 and an injection distributor 8.

The methane tank 9 takes up the greatest possible space on the methane carrying ship. This tank supports orifices 10 giving admittance to the open air in the upper part and it is heat-insulated at 11.

In accordance with the invention, the nitrogen and/or methane vapour, above the level of the liquid in the tank, is sucked into a pipe 12 by a centrifugal compressor 13 which feeds such vapour under pressure to a heat exchanger 14 in which there passes, along a branch line, a portion of the combustion gases from the gas turbine 1. Upon leaving the exchanger 14 the compressed vapour is fed into the gas turbine 1 by way of a pipe 15 and an injection distributor 16.

The transferring of motion from the compressor rotor 13 to the main shaft 2 is effected by means of bevel gears 17 and a gearing-up mechanism.

The admission temperature of the turbine is adjusted by suitably governing the flow of fuel oil and of methane.

Upon starting up, fuel supply for the turbine can be constituted solely by fuel oil, or by fuel oil and vapour, or, thirdly, by vapour alone.

In the first case, when an operative condition of low speed has been attained, the arrival of nitrogen vapour, compressed by the auxiliary compressor 13 which is driven by the turbine, makes it possible to start up the pneumatic injectors. By reason of the exhaustion of the nitrogen, the vapour of methane progressively replaces that of the nitrogen and any appropriate governing device makes it possible to regulate the flow of fuel oil in such a way that the totality of heating power in the two fuels, liquid and vapour, is maintained. The governing of the fuel oil flow can be effected, by a by-pass 19 of the pump 7 and by a regulating valve 20 in the said by-pass, as a function of the temperature of the fuels, as registered by means of a device 20a.

In the case where starting up is accomplished with fuel oil and vapour, or with vapour alone, it is necessary to provide an independent compressor to ensure overpressure in the fuel before it is introduced into the combustion chamber.

One embodiment of injector for connection to the distributors 8 and 16 will be described hereinafter with regard to FIGURES 2 to 4.

This injector includes a body 21 which receives two unions 22 and 23 for the junction of the pipes 24, for liquid fuel, and 25, for vapour (nitrogen or methane). The injector head 26, screwed onto the body 21, encloses a bushing 27 having two swellings 27a and 27b at its respective ends, each swelling bearing two diametrically opposed milled portions 27c and 27d. A central piece 27, supports a tail piece 28a swelling out at its end, and is provided with grooves 28b. A sleeve 29, having shoulders and provided with slots 29a, bears by means of one shoulder against the central piece 28 and the bushing 27, on the one hand, and a shouldered washer 30 keyed to the body 21, on the other hand.

The assembly of the pieces 27, 28, 29 and 30 is compressed against the base of the head 26 by a spring 31.

The injector above described operates in the following manner:

The liquid fuel (fuel oil) arrives via the pipe 24 and the connection 22. It passes first into the lower slots 27c and 27d, then along the exterior of the bushing 27, and then via the upper slots 27c and 27d, via the slots 29a and finally via the annular passage 32 between the tail piece 28a and the bushing 29.

The fuel vapour (CH₄) arrives via the pipe 25 and the "banjo" union 23. It passes inside the bushing 27 into the grooves 28b of the central piece 28 and flows into the annular channel 32.

The liquid and the vapour, as they arrive in this annular passage 32, are actuated by a swirling motion impressed upon them by the grooves 29a and 28b respectively. Mixing can therefore be effected intimately. The composite jet is ejected in a fan shape by virtue of the swelling on the tail 28a.

It should be noted that, by virtue of the washer 30, the margin of the orifice on the injector head does not disturb the jet.

What is claimed is:

1. In a ship for transporting a cargo a liquefied gas comprising a mixture of a combustible gas and of an incombustible gas having different boiling points, said ship comprising a gas turbine adapted to propel the ship and including a combustion chamber therefor, storage means for a liquid fuel for said turbine, and a thermally insulated non-hermetic tank means for storing the liquefied gas mixture cargo, above the level of which cargo vapor forms continuously by evaporation, a system for supplying the combustion chamber of the gas turbine with a mixture of said liquid fuel and of said vapor, which comprises an injector device adapted to inject into said combustion chamber a mixture of said liquid fuel and said vapor, means for recovering said vapor from said tank means, means for compressing said vapor, means for heating said vapor, conduit means for supplying said vapor to the injector device, means for pumping in a metered manner said liquid fuel, conduit means for supplying said fuel to the injector device, said injector device having a first inlet passage for the pumped liquid fuel, a second inlet passage for the recovered, compressed and heated vapor, a mixing chamber having inlet means connected to said first and second passages and outlet means for connecting it to the combustion chamber, said system further comprising means for regulating the liquid fuel flow supplied to the injector device so as to maintain the sum of the heating powers of said liquid fuel and of said vapor equal to a predetermined value.

2. A system according to claim 1, wherein said first and second passages comprise in the terminal zone of said passages emerging into the mixing chamber means for imparting respectively to the liquid fuel and to the vapor of the liquefied gas mixture a swirling motion.

3. A system according to claim 2, wherein the last mentioned means are slot means connecting said first and second passages to the mixing chamber.

4. A system according to claim 1, wherein the means for recovering and compressing said vapor comprise a suction conduit and a centrifugal compressor device.

5. A system according to claim 1, wherein the regulating means comprise a by-pass of the pumping means having a regulating valve monitored as a function of the temperature of gases in the combustion chamber.

References Cited

UNITED STATES PATENTS

| | | | |
|---|---|---|---|
| 2,783,624 | 3/1957 | Morrison | 62—50 XR |
| 2,938,359 | 5/1960 | Cobb et al. | 62—50 XR |
| 2,941,372 | 6/1960 | Taylor | 62—50 XR |
| 2,453,378 | 11/1948 | Lubbock | 60—39.46 XR |
| 2,907,527 | 10/1959 | Cummings. | |
| 2,933,894 | 4/1960 | Johnson et al. | 60—39.28 |
| 3,052,095 | 9/1962 | Prachar | 60—39.28 |

JULIUS E. WEST, *Primary Examiner.*